United States Patent

Bosley

[11] Patent Number: 5,805,695
[45] Date of Patent: *Sep. 8, 1998

[54] TRANSMIT BY-PASS CABLE

[75] Inventor: Terry James Bosley, Brockville, Canada

[73] Assignee: Northern Telecom Limited, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 867,263

[22] Filed: Jun. 2, 1997

Related U.S. Application Data

[63] Continuation of Ser. No. 542,996, Oct. 13, 1995, abandoned.

[51] Int. Cl.⁶ .................................................. H04M 3/50
[52] U.S. Cl. .......................... 379/395; 379/266; 379/309
[58] Field of Search ................................... 379/395, 112, 379/113, 214, 265, 267, 266, 387

[56] References Cited

U.S. PATENT DOCUMENTS

| | | | |
|---|---|---|---|
| 4,449,247 | 5/1984 | Waschka, Jr. | 455/9 |
| 4,672,663 | 6/1987 | Tomasi | 379/388 |
| 5,226,077 | 7/1993 | Lynn et al. | 379/395 |
| 5,396,551 | 3/1995 | Lucey | 379/395 |
| 5,623,544 | 4/1997 | Papadopoulos | 379/413 |

*Primary Examiner*—Ahmad F. Matar
*Assistant Examiner*—Jacques M. Saint-Surin
*Attorney, Agent, or Firm*—Jean-Pierre Fortin

[57] ABSTRACT

A transmit by-pass cable for use in a telephone system having a headset and an amplifier. The by-pass cable finds application in an automatic call distribution network having automatic log-on/log-off capability. The by-pass cable connects the amplifier to the receive pair while the transmit pair is connected directly from the terminal to the headset.

2 Claims, 1 Drawing Sheet

TRANSMIT BY-PASS CABLE

This application is a continuation of application Ser. No. 08/542,996, filed Oct. 13, 1995, now abandoned.

FIELD OF INVENTION

The present invention relates to a telephone system employing a headset and amplifier and more particularly to such a system with automatic call distribution (ACD) having an "agent walk-away" feature.

BACKGROUND OF THE INVENTION

An Automatic Call Distribution (ACD) system in a telephone network permits incoming calls to be directed to specific locations in a controlled fashion. ACD systems are used in operations in which a large volume of incoming calls are handled by a call centre dealing with customer enquiries, services and message taking. Incoming calls are preferably distributed in order of arrival to the first available operator or agent or to the operator/agent having been waiting the longest. Balancing the workload between agents ensures that each incoming call is handled promptly. Examples of such operation are customer service organization, reservations, schedules and timetables, catalog sales and telephone ordering, etc.

Agents operating in this environment normally use headsets having a separate receiver and microphone. This allows hands-free operation and permits the operator to move about while on duty. Such systems normally have automatic log-on/log-off features such that if the headset is disconnected from the operator's work station/terminal, calls will not be routed to that location. This feature, also known as "agent walk-away", recognizes that the agent is back on duty when the head set is again plugged into or otherwise connected to the terminal telephone set. This feature prevents calls from being directed to an unattended station so that callers are not kept waiting unnecessarily.

The "agent walk-away" feature is implemented in an ACD telephone system by means of a headset connect/disconnect detector. The detector monitors system characteristics such as current flow through the headset. If the headset is disconnected the current reduction is detected by a detector. Upon reconnection of the headset the normal current flow is detected.

As agents using such systems are frequently working alongside other agents, it is common for agents to incorporate an amplifier into the system in order to amplify the incoming voice message. These amplifiers are usually placed between the telephone set and headset and arranged to be interconnected via suitable connectors. The amplifier, however, negates the log-on/log-off function because when the headset is disconnected from the amplifier, the current drop is not detected by the current monitor. In order to maintain the "agent walk-away" feature the agent is obliged to disconnect both the amplifier and headset from the telephone set. As it may not always be the preference of the agent/operator to carry the amplifier with them it frequently happens that the headset is disconnected from the amplifier, thereby defeating the "agent walk-away" feature.

PRIOR ART

One way of getting around the problem is disclosed in U.S. Pat. No. 5,226,077 which issued Jul. 6, 1993 to Lynn et al and assigned to ACS Communications, Inc. In the '077 patent a specially designed amplifier having an integrated detector is described. The headset may be disconnected from the amplifier and such action is detected by the system. In order to implement this solution, however, it is necessary to make use of a dedicated and specially designed amplifier which significantly adds to the overall cost of the system.

SUMMARY OF THE INVENTION

It is an object of the present invention to provide in a telephone system having a telephone set, a headset and an amplifier, a by-pass cable whereby the amplifier is connected into the receive pair only.

It is a further object of the present invention to provide an ACD telephone system in which a headset may be disconnected from a standard amplifier without defeating the system's automatic log-on/log-off or "agent walk-away" feature.

In accordance with the invention a by-pass cable is provided for a telephone system having a telephone terminal with an automatic log on/log off feature and a headset with a headset amplifier for amplifying signals from the telephone terminal for audible reproduction at the headset. The by-pass cable includes a first connector for connection to the telephone terminal; a second connector for connection to the headset; and a transmit pair for signal transmission from the headset to the telephone terminal and for conducting current flow via the headset. The transmit pair has two ends, one of the two ends being terminated at the first connector and the other of the two ends being terminated at the second connector. The by-pass cable also includes an amplifier connection means having; first and second amplifier connectors for connection to the amplifier, a first receive signal pair with first and second ends being terminated at the first connector and at the first amplifier connector respectively, for coupling receive signals from the telephone terminal to the amplifier, and a second receive signal pair with first and second ends being terminated at the second amplifier connector and the second connector respectively, for coupling receive signals from the amplifier to the headset. Attachment and removal of the headset is detected by the automatic log on/log off feature regardless of said attachment or said removal being effected at either of the first connector and the second connector.

BRIEF DESCRIPTION OF THE DRAWINGS

The invention will now be described in greater detail with reference to the attached drawings wherein.

DETAILED DESCRIPTION OF THE INVENTION

Figure 1:
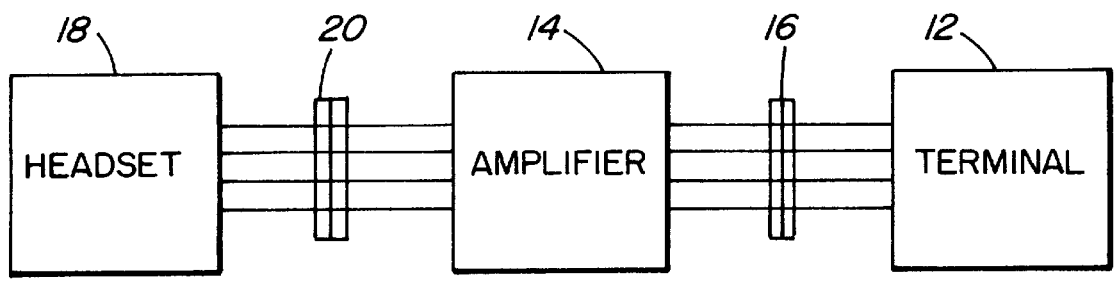
FIG. 1 is a circuit diagram of an ACD system with amplifier.

FIG. 1 illustrates a call centre having automatic call distribution according to the prior art. The telephone system 12 includes the hardware and software required to receive and direct calls to agent/operators in accordance with a system program. The system program relies on data from a detector which monitors the status of the terminals or telephone sets connected to the system. This function, also known as automatic log-in/log-off or "agent walk-away", ensures that calls are not routed to unattended telephone sets. One such automatic call distribution system is available from Northern Telecom under the Meridian ACD portfolio.

As shown in FIG. 1 the telephone system 12 is frequently augmented with an amplifier 14. Amplifier 14, of known design, increases the volume of the audio signal to the headset for the benefit of the operator/agent. Conventionally the amplifier is connected to the telephone system by a two-part connector such as connector 16. The headset 18 including a receiver and a microphone is also of known design. Currently, the headset having a 4-wire cable including a receive pair and a transmit pair is connected to the amplifier via a connector such as two-part connector 20. This connector may, of course, be on the amplifier housing or as a separate item between headset 18 and amplifier 14.

As previously discussed this prior art system monitors the current to the headset via the transmit pair. When the headset is disconnected at connector 20 no current flows to it and this change in status is detected by the log-in/log-off-feature in the telephone system. This information is used to program the system to reroute calls to other terminals/telephone sets. When the headset is reconnected the current monitor signals the system to include that terminal in the routing scheme.

The amplifier 14, however, has the effect of negating this monitoring function. Thus if the agent disconnects the headset from the amplifier at connector 20, the log-on/log-off or "agent walk-away" feature does not work. Because it is not convenient for the agent to carry the amplifier each time he/she walks away from the work station, it is unlikely that the agent will always properly log-on/log-off.

Figure 2:
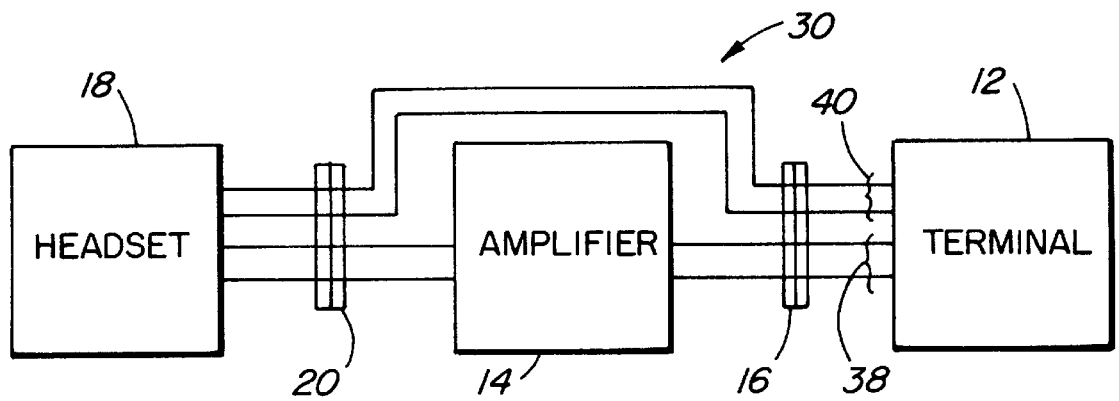
FIG. 2 is a circuit diagram employing the by-pass cable of the present invention.
Figure 3:
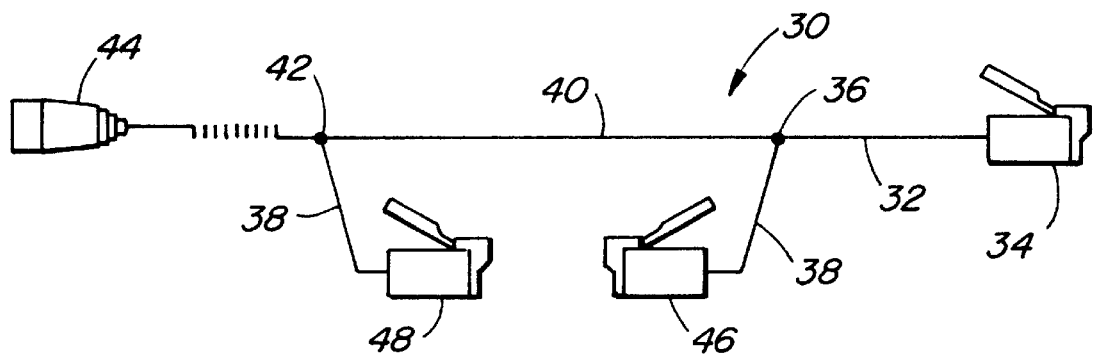
FIG. 3 illustrates a preferred embodiment of the by-pass cable.

The present invention, as illustrated in FIGS. 2 and 3, overcomes the aforementioned limitation. Elements shown in FIG. 2 which are common with those shown in FIG. 1 are identically numbered. In FIG. 2, the telephone system 12 has the same functionality as the telephone system described in relation to FIG. 1.

The headset 18 is of known design having a receiver ear piece and a microphone. An example of such a headset is the Liberation headset available from Northern Telecom. The amplifier 14 may be a Liberation Multi-Purpose Amplifier (MPA) also available from Northern Telecom.

As shown in FIG. 2 the by-pass cable 30 is intended to interconnect the headset 18 to the telephone system or terminal 12 such that the transmit pair 40 goes directly to the headset while the receive pair 38 is connected to the headset via amplifier 14. In FIG. 2 connectors 16 and 20 are shown as providing means to disconnect the headset from the amplifier and/or terminal.

A more preferred embodiment of the by-pass cable 30 is shown in FIG. 3. In this embodiment the cable 30 including both transmit pair and receive pair has at end 32 a 4-pin modular plug 34 of the type commonly used in telephone handsets. Plug 34 is intended to be connected to a telephone set or terminal (not shown). A splitter shown generally at 36 separates cable 30 into receive pair 38 and transmit pair 40. Transmit pair 40 rejoins receive pair 38 at combiner 42. The cable 30 continues on to quick connect 44 which is intended to mate with a headset (not shown). At splitter 36, receive pair 38 branches off to amplifier input connector 46. Amplifier output connector 48 is connected to combiner 42. Amplifier connectors 46,48 may also be modular handset plugs as previously described. An amplifier (not shown) will be connected between connectors 46,48.

The by-pass cable thus permits the amplifier 14 (FIG. 2) to be connected between the telephone set or terminal and the headset without negating the monitoring sytem which detects disconnection of the headset from the system.

Splitter 36 and combiner 42 may be formed by simply separating the receive pair from the transmit pair in the 4-wire cable. Alternatively, connectors may be used such as is indicated in FIG. 2.

Although a particular embodiment has been disclosed and illustrated it will be apparent to one skilled in the art that several modifications or alternatives can be made to the invention. It is understood that such modifications and alternatives will fall within the scope of the invention as defined in the appended claims.

We claim:

1. A by-pass cable for a telephone system having a telephone terminal with an automatic log on/log off feature and a headset with a headset amplifier for amplifying signals from the telephone terminal for audible reproduction at the headset, the by-pass cable comprising:

a first connector for connection to the telephone terminal;

a second connector for connection to the headset;

a transmit pair for signal transmission from the headset to the telephone terminal and for conducting current flow via the headset, the transmit pair having two ends, one of the two ends being terminated at the first connector and the other of the two ends being terminated at the second connector;

amplifier connection means including;

first and second amplifier connectors for connection to the amplifier, a first receive pair for coupling receive signals from the telephone terminal to the amplifier, the first receive pair having first and second ends being terminated at the first connector and at the first amplifier connector respectively, and a second receive pair for coupling receive signals from the amplifier to the headset, the second receive pair having first and second ends being terminated at the second amplifier connector and the second connector respectively, whereby attachment and removal of the headset is detected by the automatic log on/log off feature, regardless of said attachment or said removal being effected at either the first and second connectors.

2. A by-pass cable as defined in claim 1 wherein the transmit pair and the first receive pair and second receive pair each comprises a pair of leads.

* * * * *